Dec. 14, 1965  R. E. BLEWITT, JR  3,223,416
BOWLING BALL PATH INDICATOR
Filed Nov. 28, 1962  5 Sheets-Sheet 1

INVENTOR
ROY E. BLEWITT, JR.
BY
ATTORNEY

Dec. 14, 1965  R. E. BLEWITT, JR  3,223,416
BOWLING BALL PATH INDICATOR
Filed Nov. 28, 1962  5 Sheets-Sheet 2

INVENTOR
ROY E. BLEWITT, JR.
BY
ATTORNEY

Dec. 14, 1965

R. E. BLEWITT, JR 3,223,416

BOWLING BALL PATH INDICATOR

Filed Nov. 28, 1962

INVENTOR
ROY E. BLEWITT, JR.
BY
ATTORNEY

Dec. 14, 1965  R. E. BLEWITT, JR  3,223,416
BOWLING BALL PATH INDICATOR
Filed Nov. 28, 1962  5 Sheets-Sheet 4

FIG. 5

INVENTOR
ROY E. BLEWITT, JR.
BY
*Stewart F. Moore*
ATTORNEY

Dec. 14, 1965 R. E. BLEWITT, JR 3,223,416
BOWLING BALL PATH INDICATOR
Filed Nov. 28, 1962 5 Sheets-Sheet 5

INVENTOR
ROY E. BLEWITT, JR.
BY
ATTORNEY

United States Patent Office 3,223,416
Patented Dec. 14, 1965

3,223,416
BOWLING BALL PATH INDICATOR
Roy E. Blewitt, Jr., 100 Cedar Road, Southport, Conn.
Filed Nov. 28, 1962, Ser. No. 240,636
11 Claims. (Cl. 273—54)

This invention relates to apparatus for automatic bowling pinspotting machines and more particularly to improvements in apparatus for selecting and indicating to a player the proper path along which a ball should be rolled in order to knock down the maximum number of pins.

The present invention is an improvement in ball path indicating systems for bowling pinspotting machines of the type disclosed in Gruss et al. application, S.N. 166,616, filed January 16, 1962, for Bowling Pin Indicating System. Such ball path indicating systems generally include for each pinspotting machine, means operative prior to the rolling of a ball of a frame for determining the number and arrangement of standing pins, which means is associated with computing means for selecting the optimum ball path along which to roll the next ball in accordance with the pin number and arrangement information. Further, for each pinspotting machine an indicator is provided, coupled with the computer, which is actuated to indicate to the bowler the optimum path so selected. The bowler, by following the visual directions provided by the indicating system, rolls his ball accordingly and, if his aim is true, will knock down the maximum number of standing pins each time.

In most locations where the game of bowling is played, a plurality of bowling alleys are provided with a pinspotting machine associated with each alley. When each such machine is equipped with a ball path indicating system of the type disclosed in the aforementioned Gruss et al. application, a great duplication of component parts results since each machine is equipped with not only its own pin detector, and optimum path display device but also its own ball path computer. Because of the slow speed of response of many of the components in this system, particularly in that of the multi-contact bar relays used in the computing portion of such a system, the time sharing of duplicate units is not commercially practical.

It is accordingly an object of the present invention to provide a ball path indicating system for a plurality of pinspotting machines which has a central ball path computer unit common to all of the bowling pinspotting machines associated with this system.

It is another object of the invention to provide a high speed ball path indicating system for a plurality of bowling pinspotting machines associated therewith, which utilizes a minimum number of components and which further employs a single computer for computing the optimum ball path for all of the associated machines on a time sharing basis.

It is yet another object of the invention to provide an improved ball path computer for a ball path indicating system.

For better understanding of the invention, together with other and further objects thereof, reference is made to the following detailed description taken in connection with accompanying drawings, in which:

FIGS. 1–3 is a continuous schematic diagram of a ball path indicating system control circuit for a plurality of pinspotting machines.

FIG. 4 is a plan view of an embodiment of a ball path indicator.

FIGS. 5–5a is a continuous schematic diagram of a computing unit for a multiple pinspotting machine, ball path indicating system in accordance with the present invention.

The embodiment of the invention illustrated herein is adaptable for use with a plurality of any known automatic pinspotting machines of the general type which spot and respot pins, remove fallen pins from the bowling alley deck, and which operate in accordance with the various ball cycles required by the rules of the game of bowling, viz., first and second ball, strike and foul cycles.

Figure 1:
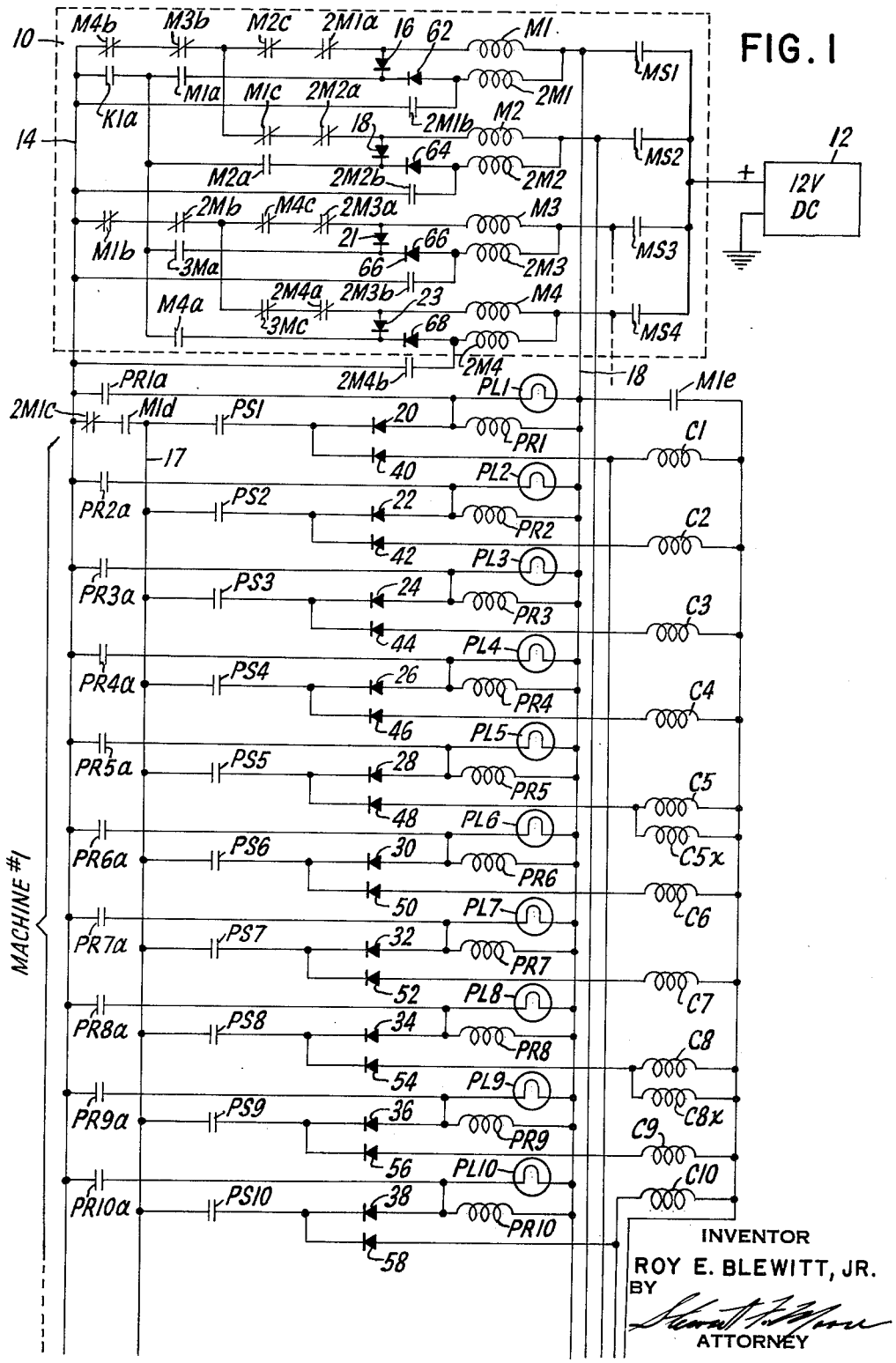
Figure 2:
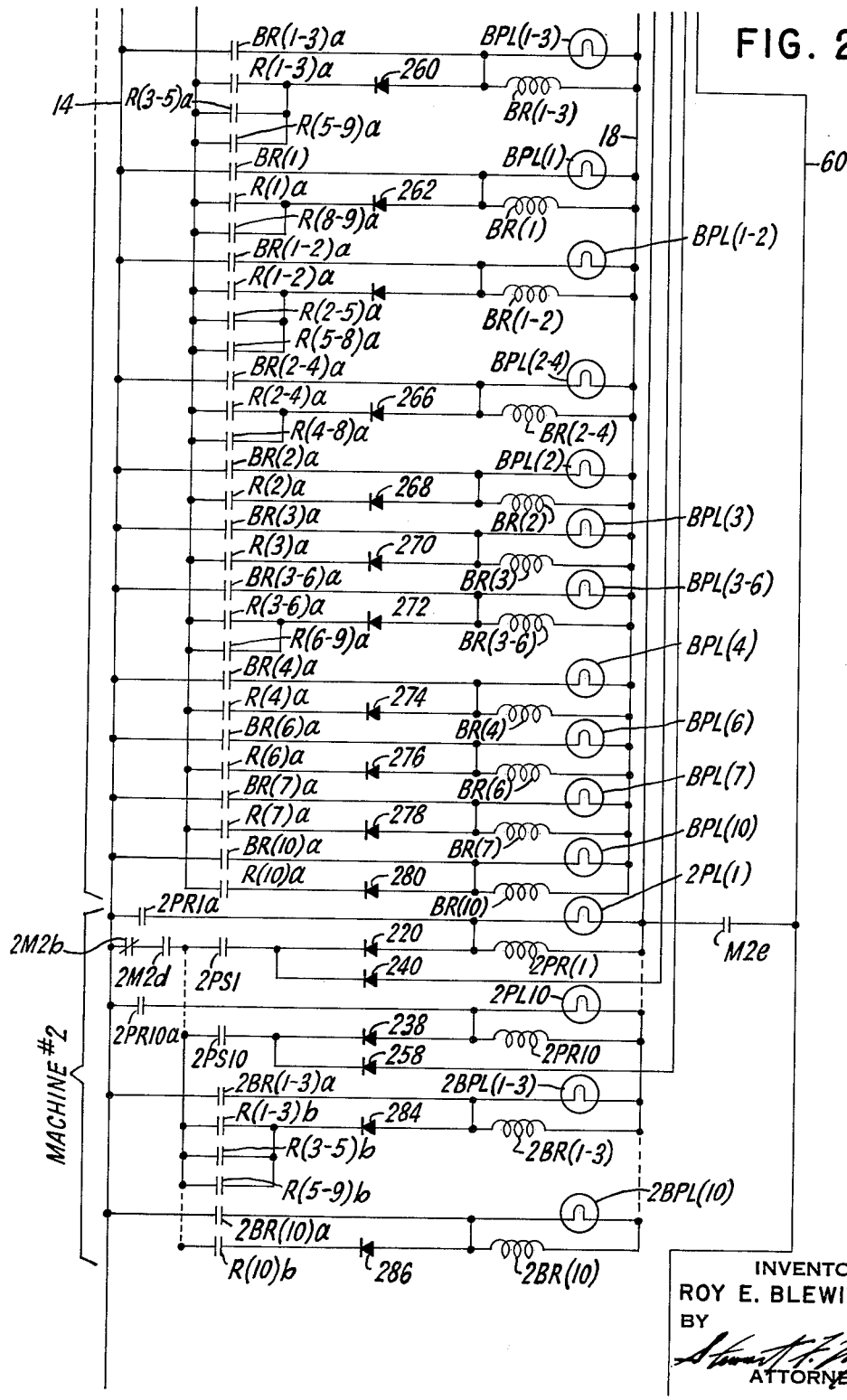

Referring now to the drawings, and particularly FIGS. 1–3, a continuous schematic circuit diagram of a ball path indicating system for four pinspotting machines is shown. While the ball path indicating system of the present invention may be adapted to determine and indicate the optimum ball path for more or less than four pinspotting machines, a four machine system will be described herein.

In general, the system has a single, central ball path computer for determining, according to information fed thereto as to the number and position of standing pins after a ball has been rolled, the optimum path selected from a predetermined number of preselected paths along which a ball should be rolled by the bowler to knock down the maximum number of said standing pins. Each machine has a facsimile of the pin deck which displays to the bowler the number and position of standing pins and also indicia associated with the standing pin display and selectively actuated by the computer for indicating the optimum predetermined ball path.

Each pinspotting machine also has detecting means for determining, at a selected interval during the operating cycle of the machine, the identity of the standing pins on the pin deck. The identification information is translated into standing pin number and position information which is fed to the input of the ball path computer. During the fraction of a second while the ball path is being computed, means are provided for preventing any of the other machines from actuating the computer. As soon as the optimum ball path for a standing pin combination has been computed, the corresponding indicia on the pin deck facsimile display associated with the machine is actuated. The computer is then immediately cleared and conditioned for receiving information from another machine as to its standing pin combination. However, holding means are provided for maintaining the ball path indicating indicia in a visible condition until the bowler chooses to roll another ball and cause the pinspotting machine to continue to progress through its operating cycle.

Since the cycling operations of any conventional pinspotter machine with which the present invention is associated are unchanged by the novel ball path indicating system on the present invention, a description of the operation of the machine in general, and in particular an electric control system therefor, will not be offered herein, but may be found fully described in R. E. Blewitt, Jr., U.S. Patent 2,983,510, dated May 9, 1961. While the present invention is particularly adapted to be operatively associated with pinspotting machines of the type shown and described in the aforesaid Blewitt patent, yet any machine operating in accordance with conventional bowling game rules may be used, provided it has detecting devices capable of detecting the presence of standing pins after a first ball of a playing frame has been rolled.

Thus in machines of the type described in the Blewitt patent, a switch associated with each pin re-spotting unit is actuated at the moment when, during a first ball cycle, the conventional machine table carrying such re-spotting units descends towards the alley floor and picks up the standing pins. For purposes of illustration, such a detecting system is incorporated in the present invention and the pin sensing switches are shown in FIG. 1 as PS(1–10).

In addition, each machine must also be provided with means for signaling that it has performed the standing pin detection function and is now ready to have its optimum ball path computed and displayed in accordance with the pin combination just detected. A suitable signaling means may be a cam operated switch, the cam of which is driven by the conventional table drive shaft and which is so connected into the control circuitry of the machine that it is activated only during the first ball cycle. The cam profile may be arranged so that the associated switch contacts are (1) closed just after the table has descended, searched for standing pins, and has begun to rise in accordance with the movement of the table drive shaft as it completes its first revolution during the first ball cycle and (2) remain closed for the duration of the cycle. Such cam operated signaling switches for each of the four machines are respectively indicated in FIG. 1 as MS1–4 and are included in the machine selector unit generally indicated as 10. As table operated cam switches are conventional devices used in pinspotting machines to translate table location into electrical information signals, for the sake of brevity the cam profiles are not shown.

Connected to one terminal of each of switches MS1–4 is a source of D.C. voltage 12 which supplies the control voltage for the entire system. Each switch MS1–4 has its other terminal connected to the operating coils of a pair of relays indicated as M–2M1, M2–2M2, M3–2M3, M4–2M4, respectively. Each set of these relays is associated with a corresponding pinspotting machine.

For purposes of illustrating the operation of the invention, assume that machine 1 is in a position to have its ball path computed. Thus, if its table has descended and detected the presence or absence of standing pins, switch MS1 will close causing relay M1 to be energized through the circuit comprising D.C. source 12, closed switch MS1, the coil of relay M1, n.c. contacts 2M1a, n.c. contacts M2c, n.c. contacts M3b, and n.c. contacts M4b to ground line 14. When relay M1 is energized, none of the other relays in machine selector unit 10 will be energized since there are n.c. M1 contacts (M1b, M1c) in series with each of the actuating coils of these relays and the ground return path. Thus, even though one or the other pinspotting machines such as the machine which operates cam switch MS2 and relay M2 is ready to have its ball path indicated, relay M2 will not be energized until relay M1 is de-energized, since n.c. contacts M1c are now open. In a like manner, if for example, relay M4 is energized before relay M1, M2, or M3 through the path comprising cam switch MS4 now closed, the coil of relay M4, n.c. contacts 2M4a, n.c. contacts M3c, n.c. contacts M2b, n.c. contacts M1b, to ground line 14, then relay M1 will not be energized even though its associated machine is ready to have its ball path indicated since n.c. contacts M4b are now open.

The coils of relays 2M1, 2M2, 2M3, and 2M4, are prevented by associated diodes 16, 18, 21, 23, respectively, from being actuated by the energization of corresponding relays M1–M4.

When cam switch MS1 is closed and relay M1 is energized, the positive control voltage from source 12 is supplied to computer relays C1–C10 (FIG. 1) through cam switch MS1 and n.o. contacts M1e. Closing of cam switch MS1 also supplies D.C. voltage to pin position lamps PL1–PL10 and to associated relays PR1–PR10.

Lamps PL1–PL10 are associated with the ball path indicator unit 400 shown in FIG. 4, which is a facsimile of the arrangement of the pins upon the pin deck. The lamps are mounted in a manner so that when illuminated, the pinspot representations indicated by the large numerals 1–10 thereon, are selectively illuminated. The indicator shown in FIG. 4 is a facsimile of the arrangement of the pins upon a pin deck and is in the form of the conventional triangular pin arrangement. It may be mounted at any location where it may be viewed conveniently by a bowler, such as immediately above the pin deck and in front of the pinspotting machine, or placed on a suitable stand adjacent to the bowler. For purposes of illustration, the selectable ball path indicating indicia are shown as a plurality of arrows positioned adjacent to the pinspot facsimiles and adapted to be selectively illuminated by the electrical system of the present invention. The indicator 400 is identical with the indicator shown in FIG. 11 of Gruss et al. application S.N. 166,616, filed January 16, 1962, for Bowling Pin Indicating System, and reference may be made thereto for a more detailed description. The means for selectively illuminating the pinspots and the ball path indicia will be described in more detail hereinafter.

Referring again to FIG. 1, pin detecting switches PS1–10 mounted on the pinsetting machine re-spotting cells and adapted to be closed when a standing pin is gripped by the cells, have a common conductor 17 which is connected to ground line 14 through contacts M1d, now closed, of relay M1 and n.c. contacts 2M1c. When any standing pin causes its corresponding pin switch PS1–10 to close, a path to ground is completed through contacts 2M1c, M1d, and associated diodes 20, 22, 24, 26, 28, 30, 32, 34, 36, 38, for corresponding pin lights PL1–10 and parallel connected pin relays PR1–10 which are in turn connected to positive conductor line 18. Each relay PR1–10 has a set of n.o. contacts PR1–10a connected directly between its corersponding pin light PL1–10 to ground line 14 which, when closed, bypasses contacts PS1–10 and serves as holding contacts for relays PR1–10. It also maintains lamps PL1–10 in an illuminated state even after its corresponding contacts PS1–10 open subsequently.

Closure of one or more pin switches PS1–10 causes actuation of a corresponding relay coil C1–10 through associated diodes 40, 42, 44, 46, 48, 50, 52, 54, 56, 58. Diodes 20–38 prevent relays PR1–10 from energizing relays C1–10 or relays C5x and C8x. Diodes 40–58 prevent standing pin indicating signals from any of the other machines, which may energize relays C1–C10, from also energizing the PR1–10 relays in machine No. 1.

In FIG. 2, there is shown in abbreviated form, duplicate circuitry to that just described for machine No. 2. Thus machine No. 2 has a ball pin indicator with indicating lamps 2PL1–10, pin relays 2PR1–10, actuated by pin switches 2PS1–10 through diodes 220–338. The actuating circuits for these components are completed through n.o. contacts 2M2d and n.c. contacts 2M2b to ground line 14. Each relay 2PR1–10 likewise has associated holding contacts 2PR1a–10a which operate in the manner described above for contacts PR1a–10a. It will be noted, however, that relays C1–C10, C5x and C8x are common to the circuits for machines 1, 2, 3, and 4, and are not duplicated. Thus, relays C1–C10, C5x and C8x are connected to machine No. 2 pin switch circuit through diodes 240–58. Likewise, machines No. 3 and 4 are similarly connected but for the sake of brevity circuitry therefor is not shown herein.

Upon closure of contact M1e and the consequent application of positive voltage to line 60 to which relays C1–10 are connected, energy is supplied to the coil of relay K2 (FIG. 3) through n.c. contacts K1b and n.c. contacts ONS2b. Relay K2 is a time delay type and has a time delay of about 50 to 100 milliseconds, in order to allow relay C1–10 sufficient time to actuate before the circuits controlled by relay K2 are activated. Energization of relay K2 causes closure of contacts K2a which in turn causes the coil 302 of a stepper relay SR1 to be energized through a circuit comprising ground lead 14, contacts K2a, coil 302, and interrupter contacts 304 of relay SR1 to positive line 60. When the coil 302 is energized, its interrupter contacts 304 open and the stepper will move from step 0 to step 1.

Figure 5A:
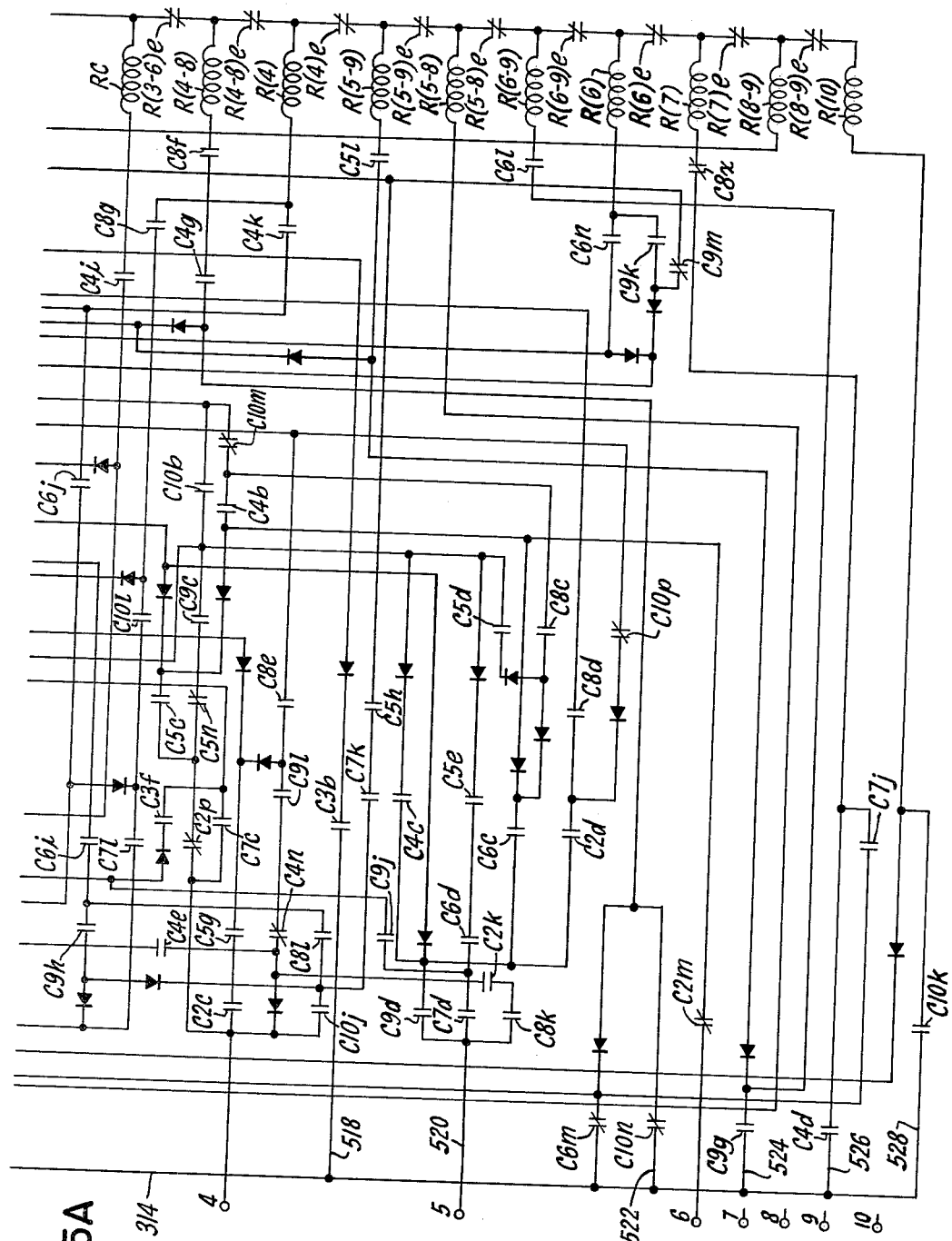

Stepper relay SR1 has 10 operating contacts which are grounded in series wih n.c. switches C1–10a and ground. Whenever one of relays C1–C10 (FIG. 1) is energized, its corresponding contacts C1–10a will be opened. Thus, if pin number 1 is not standing, relay C1 will not be energized and the stepper relay SR1 will immediately move from step 1 to step 2. This process will continue until the stepper reaches a point representative of a standing pin in which case the corresponding relay C1–10 will be energized and its corresponding contacts C1–10a will be opened. At this point stepper relay SR1 will stop. For example, assume that the first standing pin to be detected is pin No. 3. Then, n.c. contacts C3a of level #1 of stepper relay SR1 will open and n.o. contacts C3b of level #2 will close. When contacts C3a open, the circuit to stepper relay coil 302 is broken, thereby causing the relay to stop on position 3. However, the closing of contacts C3b energize the actuating coil 306 of a stepper relay SR2 through a circuit including interrupter contacts 304. The level #1 contacts of relay SR2 are connected to computers 300 and are shown in FIGS. 5–5a.

When the actuating coil 306 of stepper relay SR2 is energized, n.o. interrupter contacts 308 associated with relay SR2 will close. Closure of these contacts completes a path to ground from actuating coil 302, stepper relay SR1, through a circuit comprising now closed interrupter contact 304, coil 302, diode 310, "off normal" contacts ONS1a, now closed, through momentarily closed contacts 308 to ground line 14. "Off normal" contacts ONS1a are the contacts usually found on all conventional stepping switches and are operated by a cam which is associated with the movement of the various contact level arms. This cam closes or opens one or more switches whenever the actuating arms move away from the 0 or normal position. Thus, since stepper relay SR1 has moved away from its 0 position, "off normal" contacts ONS1a are now closed.

Upon the re-energization of coil 302, interrupter contacts 304 again open as both stepper relay SR1 (FIG. 3) and SR2 (FIGS. 5–5a) have advanced one step. Stepper relay SR2 serves to count and temporarily store the number of standing pins in accordance with the information presented to it by scanning stepper relay SR1 which scans the contacts of relays C1–10 to determine their open or closed condition and thus, in effect, searches for the presence of standing pins. Again referring to the example of where pin number 3 has been detected as standing, the condition of stepper relay SR2 is that it is now counted one standing pin.

Stepper relay SR1 has now been advanced from contact position 3 to position 4, and if pin 4 is not standing, then it will continue to advance until it reaches the next standing pin where the sequence of the two stepper relays is again repeated in the manner just described. In general, it will be seen that stepper relay SR1 advances to search for the presence of standing pins, and stops momentarily when it finds one. At this point stepper relay SR2 advances one position to temporarily store the standing pin count, and in turn causes stepper relay SR1 to advance again. Stepper relay SR1 continues until it finds another standing pin, whereupon the whole process is repeated. This process continues until stepper relay SR1 has completed its search and returns to its 0 position.

When relay SR1 returns to its 0 position, n.c. "off normal" contacts ONS1b will now be closed. However, as standing pins have been counted and their total temporarily stored in stepper relay SR2, "off normal" contacts ONS2a will also be closed as stepper relay SR2 is stopped at some position other than 0. A ground return path is therefore provided for the circuits in ball path computer 300, through a circuit path comprising ground line 14, closed contacts ONS2a, line 312, closed contacts ONS1b, to line 314.

Referring now to FIGS. 5–5a, which show a schematic diagram of the details of the ball path computer unit of the present invention, 18 relays which will hereinafter be designated as R(1–3)–(10) are connected to interruptable line 60. These relays are indicated as R(1–3), R(1), R(1–2), R(2–4), R(2), R(2–5), R(3–5), R(3), R(3–6), R(4–8), R(4), R(5–9), R(5–8), R(6–9), R(6), R(7), R(8–9), and R(10). In addition there are three special function relays also similarly connected and designated as RA RB and RC. Each of these relays is adapted to be energized by being selectively connected to ground line 314 by means of one of the contacts of level #1 of stepper relay SR2 in conjunction with interlocking circuitry which will be described in detail hereinafter.

Ignore for a moment the circuitry involved, but assume that stepper relay SR2 has advanced to one of its contact positions 1–6, indicating that some standing pins have been counted, and that one of the relays R(1–3)–(10) has been energized. Then operation of one of these relays will close its corresponding contact R(1–3)f–(10)f (FIG. 3). When any one of these contacts has been closed, the coil of relay K1 is energized. Relay K1, which is also a time delay relay with a delay time similar to relay K2, will then remain energized through a holding circuit comprising contacts ONS2a, contacts K1d and diode 322.

The energizing of any one of computer relays R(1–3)–(10) will also cause the energization of a corresponding ball path relay BR(1–3)–(10), associated with machine No. 1 (FIG. 2), through one of diodes 260, 262, 264, 266, 268, 270, 272, 274, 276, 278, 280, by closure of one of the contacts R(1–3)a–(10)a. After the initial energization of one of the BR(1–3)–(10) relays, it is locked in through a holding circuit which includes a corresponding one of contacts BR(1–3)a–(10)a. This operation also lights the correct corresponding ball path lamp BPL(1–3)–(10) as shown in FIG. 2.

Similarly, as was the case with the disclosure of the pin indicating circuits for machine No. 2, as described above, in FIG. 2 there is also shown in abbreviated form, circuitry for the ball path indicator of machine No. 2, which is the duplicate of that of machine No. 1. Thus, machine No. 2 has ball path indicator lamps 2BPL(1–3)–(10), initially energized by contacts R(1–3)B–(10)B of relay R(1–3)–(10) through diodes 284, 286 respectively. The selected indicator lamp is maintained in an energized condition by relays 2BR(1–3)–(10) and holding contacts 2BR(1–3)a–(10)a.

Although eighteen discrete ball path choices are available in accordance with the embodiment of the invention disclosed herein, for practical purposes eleven ball path indicia are used. The ball path indicia may be in the form of arrows on a pin deck facsimile 400, as shown in FIG. 4 and mentioned above. The eleven ball path lamps may be mounted so as to illuminate one of the selected indicia and these are indicated as: BPL(1–3), BPL(1), BPL(1–2), BPL(2–4), BPL(2), BPL(3), BPL(3–6), BPL(4), BPL(6), BPL(7), BPL(10). The parenthetical reference numerals designate the position of the ball path indicia on facsimile 400 with respect to adjacent pin spots. For example, referring to FIG. 2, the lamp indicated as BPL(1–3) illuminates the arrow positioned between pins 1 and 3 on facsimile mask 400 (FIG. 4). The contacts associated with the unused outputs of computer relays R(1–3)–(10) are connected in parallel with active contacts in order that a single ball path indicia may function in place of several of the unused ball path selections. For example, lamp BPL(1–3) will light not only when computer relay contacts R(1–3)a are closed but also if contacts R(3–5)a or R(5–9)a are also closed. In a like manner, ball path lamp BPL(1)

will be illuminated when contacts R(1)a or contacts R(8–9)a are closed and, in a similar manner, BPL(1–2) will light when contacts R(2–5)a or R(5–8)a are closed. Likewise, BPL(2–4) will light when contacts R(2–4)a or contacts R(4–8)a are closed. Lamp BPL(2) will light when contacts R(2)a are closed and lamp BPL(3–6) will light when contacts R(3–6)a or contacts R(6–9)a are closed.

It will be remembered that relay K1, a time delay relay, was energized when any one of contacts R(1–3)f–(10)f closed. This relay is the computer clearing, and stepper reset relay, and has a time delay sufficient to allow the selected ball path relay BR(1–3)–(10) to operate, before "clearing" and "resetting" begins.

Referring again to FIG. 1, relay 2M1 of machine selector unit 10 is energized when relay K1 (FIG. 3) is energized, by means of a circuit comprising the coil of relay 2M1, diode 62, now closed contacts M1a and now closed contacts K1a to ground line 14. Relay coil 2M1 is then held in an energized condition through closure of its own holding contact 2M1b. Closure of contacts 2M1b causes normally closed contacts 2M1c to open, thereby removing the ground connection to pin detector switches PS1–10 and the relays C1–10 so that all such relays corresponding to pins left standing on machine No. 1 will drop out. However, pin lamps PL1–10 will remain illuminated as they are held in that condition by relay contacts PR1a–10a, the proper ones being held depending upon which pins were originally standing at the time of detection.

When the ground connection to line 17 is broken by the opening of contacts 2M1c, the initial energizing circuit through one of contacts R(1–3)a–(10)a to one of ball path relays BR(1–3)–(10) is also broken. However, the proper ball path light remains energized as does the selected ball path relay BPR(1–3)–(10) through its own holding contact BR(1–3)a–(10)a.

During the period that relay K1 is energized, relay M1 (FIG. 1) also remains energized through contacts K1a, M1a and diode 16. However, stepper relay SR2 will return to 0 when relay K1 is energized through the circuit comprising "off normal" contacts ONS2a, contacts K1c, its own interrupter contacts 316, and diode 320. Both stepper relays have now been reset to their 0 positions, computer relays C1–10 are now deenergized and computer 300 is now cleared.

When stepper relay SR2 returns to 0, its "off normal" contact ONS2a will open, thus breaking the circuit to the coil of relay K1. When relay K1 is deenergized, contact K1a in machine selector unit 10 (FIG. 1) opens and allows relay M1 to become deenergized so that its n.o. contacts M1a, M1d and M1e open, and its n.c. contacts M1b and M1c again become closed. The coil of relay M1 cannot remain energized through contacts 2M1b because of the blocking action of rectifier 62. The deenergization of relay M1 permits any of the other machine relays M2, M3, M4 to operate if their corresponding cam operated machine switches MS2, MS3, MS4 closes, so that computation of a new optimum ball path for the corresponding machine can proceed even though the previous ball path for machine No. 1 is still displayed on its pin deck facsimile.

Relay 2M1 remains energized so that the information now on the ball path indicator 400 as to the identity of the standing pins and the proper ball path along which to roll the ball to knock down the maximum number of pins remains displayed to the bowler until machine switch MS1 is opened upon the rolling of the next succeeding ball of a frame. When switch MS1 opens, power is removed from line 18 so that lamps PL1–10, relays PR1–10, lamps BPL(1–3)–(10) and relays BR(1–3)–(10) are all deenergized.

BALL PATH COMPUTER

The ball path computer 300 will now be described in connection with FIGS. 5–5a, which show in detail the circuitry therefor. While there are 1,023 possible standing pin combinations, yet a great number of these are impossible to produce in the game of bowling. For example, it would be impossible to knock down the 8 or 9 pin only, without knocking down either the 4, 5, or 6 pin. Therefore, the following combinations do not have a ball path indicated for them:

*Pin combinations*

| Standing pins: | Pins not standing |
|---|---|
| 2, 3 | 1. |
| 3, 4, 5 | 1, 2. |
| 2, 5, 6 | 1, 3. |
| 4, 5, 9, 10 | 1, 2 or 3. |
| 5, 6, 7, 8 | 1, 2 or 3. |
| 7, 8, 9, 10 | Except where all pins are standing. |
| 4, 5, 6 | Except where all pins are standing or all but the 7 pin are standing, or all but the 10 pin are standing. |

The number of ball paths to be indicated to the bowler, and the positioning of the ball path indicia on facsimile 400, both are a matter of choice. In practice, it has been found that eleven discrete ball path indications are ample without confusing the bowler. However, as mentioned above, the computer 300, as shown in FIGS. 5–5a, is capable of selecting one of eighteen optimum ball paths. The locations of the ball paths indica arrows designated by their associated lamps BPL(1–3)–(10), as shown in FIG. 4, was determined from bowling player experience.

In general, the circuitry shown in FIGS. 5–5a, utilizes the fact for all possible pin combinations except a strike or gutter ball, certain pins are not standing, as well as the fact that certain pins are standing. Furthermore, the circuitry is so arranged that the ball path selections are made in accordance with a predetermined order of priority, such that when a ball path of higher priority has been selected, it is not possible for a given pin combination to select a path of lower priority. Accordingly, ball path computer relays R(1–3)–(10), which are the computer "read-out" relays, are connected to line 60 in accordance with such a predetermined order of priority. Each relay, except relay R(10) has a n.c. contact R(1–3)e–(8–9)e connected in series with line 60 and immediately following the connection thereto of the relay with which it is associated. Thus, whenever one of relays R(1–3)–(8–9) is energized, all other relays connected to line 60 and more remote from the source of D.C. potential 12 are disconnected therefrom. For example, if a certain pin combination causes computer 300 to ascertain that relay R(2–4) should be energized, then all other relays commencing with relay R(2), as shown on the right hand portions of FIGS. 5–5a in descending order, will be disconnected from line 60 by the opening of contacts R(2–4)e.

The relays C1–10, C5x, C8x, shown in FIG. 1 have multiple contacts interlockingly connected with each other in the circuit arrangement shown in FIGS. 5–5a, and are designated as C1b, C1c–C1p, C6b, C6c–C6p. Thus, contacts C3b–p are actuated by relay coil C3 (FIG. 1), contacts C6b–p are actuated by coil C6, and the same is true for the remaining contacts shown in FIGS. 5–5a bearing reference numerals identifiable with the remainder of relays C1–10.

The operation of the circuits comprising computer 300 will now be described in detail. It will be remembered that computer ground line 314 is activated when contacts ONS2a are closed and contacts ONS1b have closed (FIG. 3). This condition exists when stepper relay SR2 has been advanced from its 0 position and has stored a count, and stepper relay SR1 has completed its scanning operation and has returned to its 0 position. Then one of the circuits connected between one of the computer relays R(1-3)-(10) and the contact position on which stepper relay SR2 wiper arm has stopped will be activated, deenergized. Likewise, the activated circuit will complete a ground path for the computer relay R(1-31)-(10) to which it is connected.

For example, assume that stepper relay SR2 has received a count of 3 standing pins and accordingly has stopped on its position No. 3. Additionally, assume that pins 1, 5 and 6 remain standing. Then a path will be completed which will energize computer relay R(1-3) through a series circuit including now closed contacts C1b, C6b, C5b, and n.c. contacts C8n through a diode to position 3 of stepper relay SR2. In accordance with the operation described above, the ball path arrow BPL1-3 of facsimile 400 will be subsequently illuminated.

As another example, assume that stepper relay SR2 has again counted 3 standing pins and that this pin combination includes pins 1, 5 and any other pin except pins 4 and 6. It is assumed that pins 4 and 6 have fallen. Then, a circuit path will be completed from the coil of relay R(1) through series connected contacts C1c, C5f, and n.c. contacts C6e, n.c. contacts C4p, to SR2 relay position No. 3. Since the stepper relay SR2 has counted three standing pins, then any other pin in addition to standing pins 1 and 5 will cause computer relay R(1) to be energized provided the other pin is neither pin 4 nor 6. If such a pin were 4 or 6, then n.c. contact C4p and C6e would be actuated and would be open. As soon as relay R(1) is energized, contacts R(1)e will open, thus preventing any of the other relays of lower priority from being energized.

While there are numerous diodes shown in the circuits of FIGS. 5-5a, for the sake of clarity and to simplify the description of the present invention, these diodes have not been given reference numerals nor described in detail herein. It is understood that the diodes are interconnected among the various circuits shown in FIGS. 5-5a, in a manner such as to prevent "sneak circuits" but yet allow a minimum number of contacts and associated lines to be used in order to perform the computing function. The diodes are shown connected conventionally in accordance with the direction of current flow, and will effectively isolate the circuit in which they are connected as long as a difference of potential in a favorable direction does not exist across the diode electrodes.

By tracing the circuits in the manner just described, it is possible to trace out the actuating circuits for several hundred standing pin combinations which will activate the proper computer relay R(1-3)-(10) and ultimately cause the correct ball path indicator indicia to be illuminated. Without tracing each individual circuit, the many standing pin combinations for which the computer 300 is adapted to compute the proper ball path related thereto, are listed below in semi-tabular form, grouped with the particular relay to be energized, in accordance with the "pins standing" and "pins not standing" combinations occurring after a selected ball of a playing frame is rolled. That is, for any combination to cause its relay to be energized, the pins so listed in the left hand column must be standing, and at least the pins listed in the right hand column must not be standing.

Relay R(1-3) will be energized if the 1 and 3 pins are standing and relay A is not energized. Relay R(1-3) is also energized if:

| Pins standing: | Pins not standing |
|---|---|
| 1, 6 | All others. |
| 1, 7 | Do. |
| 1, 9 | Do. |
| 1, 5, 6 | Do. |
| 1, 7 and one other pin | 2, 5, 8. |
| 1, 9 and one other pin | 2, 5, 8. |
| 1, 7, 5 and one other pin | 2. |
| 1, 9, 7 and one other pin | All others. |
| 1, 6, 9 and one other pin | 5, 2. |
| 1, 10, 9 and one other pin | 2, 5. |
| 1, 4, 5 and one other pin | 2, 10. |
| 1, 7, 9 and two other pins | All others. |
| 1, 10, 4, 9 and one other pin | Do. |
| 1, 8, 6, 9 and one other pin | Do. |
| 1, 4, 6, 9 and one other pin | Do. |
| 1, 8, 5, 4, 9 | 10. |
| 1, 10, 5, 6, 7 | All others. |
| 1, 4 and four other pins | 2, 10. |

Relay A will be energized and none of the above combinations will energize the R(1-3) relay if pins 8, 2, and 9 are left standing in a five pin combination. Therefore, the combination of pins 1, 3, 8, 2, and 9 will not energize the R(1-3) relay even though pins 1 and 3 are left standing. However, all other combinations in which pins 1 and 3 are left standing will energize the R(1-3) relay.

Relay R(1) will be energized if relay R(1-3) has not been energized and:

| Pins standing: | Pins not standing |
|---|---|
| 1 | All others. |
| 5 | Do. |
| 1, 5 | Do. |
| 1, 9 | Do. |
| 1, 5 and any one other pin | 4, 6. |
| 1, 9 and any one other pin | 4, 6. |
| 1, 9, 2, 5 | All others. |
| 1, 8, 2, 5 | Do. |
| 1, 8, 9 and any one other pin | 4. |
| 1, 2, 9 and any two other pins | 10. |

If relay R(1) is energized, then contacts R(1)e will be open and no other computer relay may be energized.

Relay R(1-2) will be energized by any combination in which the pin 1 is standing, provided that such combination has not energized either the R(1-3) relay or the R(1) relay. These three relays will, therefore, account for all combinations in which the pin 1 is standing, which is a total of 512 combinations. If relay R(1-2) is energize, then n.c. contacts R(1-2)e will open and no other ball path relay of lower priority may be energized.

Relay R(2-4) may be energized provided neither relays R(1-3), R(1) or R(1-2) have been energized. The following combinations of standing and not standing pins will, therefore, energize relay R(2-4):

| Pins standing: | Pins not standing |
|---|---|
| At least 2, 4 | 5, 9. |
| At least 2, 4, 6 | 5. |
| At least 2, 4, 8 | 5. |
| At least 2, 6 | 5, 8, 9. |
| At least 2, 6, 7 | 5. |
| At least 2, 7, 10 | 5, 9. |
| At least 2, 7 | 8, 9. |
| 2, 5, 7 and one other pin | All others. |
| 2, 10 | Do. |

If relay R(2-4) has been energized, then n.c. contact R(2-4)e will be open and no subsequent relay may be energized. However, if none of the preceding relays have been energized, relay R(2) may be energized by any one of the following combinations:

| Pins standing: | Pins not standing |
|---|---|
| 2 | All others. |
| 8 | Do. |
| 8, 2 | Do. |
| 8, 10 | Do. |
| 2, 5, 10 | Do. |
| 8, 10, 2 | Do. |
| 8, 6, 2 | Do. |
| 8, 7, 2 | Do. |
| 2, 10, 5, 4 | Do. |
| 2, 10, 5, 4, 8 | Do. |
| At least 4, 5 | 2. |

If relay R(2) is energized, then contacts R(2)e will open and no subsequent relay of lower priority will be energized.

If none of the preceding relays of higher priority have been energized, then relay R(2-5) will be energized by any combination in which pin 2 is standing unless this combination also energizes relay RB whereupon relay contacts RB1 will be opened. Relay RB will be energized if none of the preceding ball path relays of higher priority have been energized including relay R(2) and the following pin combinations are standing:

Pins standing:
    6, 9 and one other pin
    6, 9, 10 and one other pin
    6, 8, 10 and one other pin If none of the preceding computer relays of higher priority have been energized, relay R(3-5) may be energized by any of the following pin combinations:

| Pins standing: | Pins not standing |
|---|---|
| At least 3, 5 | 6, 7 |
| At least 3, 8 | 4, 6 |

If relay R(3-5) is energized, n.c. contact R(3-5)e will open and no subsequent computer relay may be energized.

If none of the preceding relays of higher priority have been energized, relay R(3) may be energized by any of the following pin combinations:

| Pins standing: | Pins not standing |
|---|---|
| At least 5, 6 | 3. |
| 3 | All others. |
| 9 | Do. |
| 3, 9 | Do. |
| 3, 9, 7 | Do. |
| 3, 9, 4 | Do. |

If relay R(3) is energized, n.c. contact R(3)e will open and no subsequent computer relay of lower priority will be energized.

If none of the preceding computer relays of higher priority have been energized, then relay R(3-6) will be energized by any combination in which pin 3 is standing, provided relay RC is not energized. Relay RC will be energized provided none of the previous computer relays up to and including relay R(3) have been energized, by any of the following pin combinations:

| Pins standing: | Pins not standing |
|---|---|
| 4, 8 and one other pin | All others. |
| 4, 8, 3, 7 | Do. |
| 4, 9, 7 and one other pin | Do. |
| 4, 8, 9, 7 and one other pin | Do. |

If relay R(3-6) is energized, then n.c. contact R(3-6)e will open and none of the subsequent relays of lower priority will be energized.

Assuming that none of the previous computer relays of higher priority have been energized, then relay R(4-8) will be energized by any of the following combinations:

| Pins standing: | Pins not standing |
|---|---|
| At least 4, 8 | 6, 10. |
| At least 4, 8, 7 | All others. |

If relay R(4-8) is energized, then n.c. contacts R(4-8)e open and no subsequent relay of lower priority may be energized.

If none of the preceding computer relays of higher priority have been energized, then relay R(4) may be energized by any of the following combinations:

| Pins standing: | Pins not standing |
|---|---|
| 4 | All others. |
| 4, 7 | Do. |
| 4, 6 | Do. |
| 4, 6, 7 | Do. |
| 8, 10, 7 | Do. |

If relay R(4) is energized, then n.c. contacts R(4)e will open and none of the subsequent relays of lower priority will be energized.

If none of the previous computer relays of higher priority have been energized, then relay R(5-9) may be energized by any combination in which pins 5 and 7 are standing or any combination in which pins 5 and 9 are standing. If relay R(5-9) is energized, then n.c. contacts R(5-9)e will open and none of the subsequent relays of lower priority may be energized.

If none of the previous relays of higher priority have been energized, then relay R(5-8) will be energized by any combination of pins remaining in which the pin 5 is standing. If relay R(5-8) is energized, then n.c. contacts R(5-8)e will open and none of the subsequent relays of lower priority will be energized.

If none of the previous computer relays have been energized, then relay R(6-9) may be energized by any combination in which the pins 6 and 9 are standing. If none of the previous relays including R(6-9) have been energized, then relay R(6) may be energized by any of the following combinations:

| Pins standing: | Pins not standing |
|---|---|
| 6 | All others. |
| 9, 10 | Do. |
| 4, 9, 10 | Do. |
| 7, 9, 10 | Do. |
| 4, 10, 6 | Do. |

If relay R(6) is energized, then n.c. contact R(6)e will open and none of the subsequent relays of lower priority will be energized.

Assuming that none of the preceding computer relays have been energized, relay R(7) may be energized by any of the following combinations:

Any combination in which pin 4 is standing and pin 8 is not standing; and any combination in which pin 7 is standing and neither 6 nor 8 are standing.

If relay R(7) is energized, then n.c. relay contacts R(7)e will open and none of the subsequent relays will be energized.

If none of the preceding computer relays of higher priority have been energized, then computer relay R(8-9) may be energized by any of the following combinations:

| Pins standing: | Pins not standing |
|---|---|
| 9 and one other pin | All others. |
| 9, 10 and one other pin | 3. |
| 9, 7, and one other pin | All others. |

If neither relay R(8-9) nor any of the other computer relays mentioned above are energized, then relay R(10) may be energized by any combination in which pin 6 is standing or any combination in which pin 10 is standing.

It will be noted that there are no connections to the contacts of stepper relay SR2 for positions 7, 8, 9, 10. For these higher numbered combinations, individual groups of circuits are not needed since one of the circuits described above, which is connected directly to line 314 without going through a contact of the stepper relay SR2, will energize the proper computer relay for such combinations. The circuits which are adapted to handle combinations greater than 6 pins are designated in FIGS. 5-5a by reference numerals 500, 502, 504, 506, 508, 510, 512, 514, 516, 518, 520, 522, 524, 526 and 528. For example, assume that upon the rolling of the first ball of a frame, that only pin 10 was knocked down. Then computer relay R(1-3) will close since for any combination greater than 6 in which the 1 and 3 pins are still standing, the proper ball path indicia to be illuminated is BPL(1-3).

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

What is claimed is:

1. In a ball path indicating system for a bowling lane of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a plurality of pin combination circuits each representative of a selected standing pin combination and having active and passive states with one of said circuits being selectively activated in accordance with pin position and totals information for a corresponding detected pin combination, each of said pin combination circuits being connected to one of said indicia actuation means, and operative when activated to energize said associated indicia actuating means, selected ones of said combination circuits being designated as key combination circuits, each of said key combination circuits having means operative in response to the detected presence of certain selected standing pins, regardless of the detected presence of additional standing pins, for activating th circuit associated therewith, said indicia actuating means including said actuating means of said key combination circuits being arranged in a predetermined order of priority, and each of said indicia actuating means having interlocking means operative to incapacitate the actuating means of a lower priority to prevent undesired indicia from being actuated for each detected standing pin combination.

2. In a ball path indicating system for a bowling lane of the type having means for detecting the identity of standing pins on a pin deck, an optimum ball path selection computer and indicating means having selectable indicia with actuating means for each indicia energized by said computer to indicate the optimum ball path for a selected pin combination, said computer comprising a plurality of pin combination circuits each representative of a selected standing pin combination and having active and passive states with one of said circuits being selectively activated in accordance with pin position and totals information for a corresponding detected pin combination, each of said pin combination circuits being connected to one of said indicia actuation means, and operative when activated to energize said associated indicia actuating means, and means connected to at least one of said pin combination circuits and operative in response to the detected presence of certain selected standing pins among a group of standing pins and absence of certain other selected standing pins for conditioning said circuit for activation regardless of the detected presence of additional standing pins in accordance with both selected standing and fallen pins.

3. In a ball path indicating system for a bowling lane of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a first and second plurality of pin combination circuits each representative of a selected standing pin combination and having active and passive states, said first plurality of circuits being arranged into discrete groups, each group being representative of different, selected standing pin totals, each of said first plurality of circuits within said groups being selectively activated in accordance with pin position and totals information for a corresponding detected pin combination, and each of said second plurality of circuits being activated in accordance with selected pin position information only for a corresponding detected pin combination, each of said first and second plurality of pin combination circuits being connected to one of said indicia actuation means, and operative when activated to energize said associated actuating means, and operative when activated to energize said associated actuating means.

4. In a ball path indicating system for a bowling lane of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a first and second plurality of pin combination circuits each representative of a selected standing pin combination and having active and passive states, said first plurality of circuits being arranged into discrete groups, each group being representative of different, selected standing pin totals, each of said first plurality of circuits within said groups being selectively activated in accordance with pin position and totals information for a corresponding detected pin combination, and each of said second plurality of circuits being activated in accordance with selected pin position information only for a corresponding detected pin combination, each of said first and second plurality of pin combination circuits being connected to one of said indicia actuation means, and operative when activated to energize said associated actuating means, said indicia actuating means of said first and second plurality of combination circuits being arranged in a predetermined order of priority, and each of said indicia actuating means having interlocking means operative to incapacitate the actuating means of a lower priority to prevent undesired indicia from being actuated for each detected standing pin combination.

5. A ball path indicating system for a plurality of bowling lanes comprising, means associated with each lane for sensing the identity of standing pins on the pin deck thereof, storing means common to each of said pin identity sensing means and operatively coupled thereto for storing the identity of standing pins sensed thereby, single ball path computing means common to each of said lanes and operative in response to activation of said storing means for computing and selecting, in accordance with the stored identity of a selected set of standing pins, an optimum ball path for knocking down the maximum number of said selected set of standing pins, an indicating means associated with each of said lanes and operatively connected to said single ball path computing means for indicating to a bowler, when activated, an optimum ball path for a selected set of standing pins, and means connected respectively to said storing means, said identity sensing means and said indicating means, and operative in response to the activation of one of said pin identity sensing means for activating said storing means and ball path indicating means, whereby said single ball path computing means is effective to compute a corresponding optimum ball path for the standing pins associated with said activated identity sensing means for display by said corresponding indicating means.

6. The invention defined in claim 5 wherein said system includes a single storing means and wherein said means for activating said single storing means includes interlocking means connected to each of said identity sensing means and operative in response to commencement of a ball path selection by said single computing means to prevent any of said other sensing means from activating said single storing means until said commenced ball path selection has been completed.

7. The invention defined in claim 6 including means operative in response to the actuation of one of said indicating means for maintaining said indicating means in an activated condition until the next ball of a frame is rolled on the alley with which said activated indicator is associated, and further including means operative in response to activation of said last-named means for deactivating said single storing means to place it in condition to receive pin identity information from another of said pin identity sensing means.

8. The invention defined in claim 6 including means operative after said optimum ball path has been selected for clearing said single ball path computing means and said storing means of stored information and conditioning said storing means to receive pin identity information from activated pin sensing means of another lane.

9. The invention defined in claim 6 including means operative after said optimum ball path has been selected for clearing said ball path computing means and said storing means of stored information and conditioning said storing means to receive pin identity information from activated pin sensing means of another lane, and means responsive to actuation of said clearing and conditioning means for deactivating said interlocking means to allow any other activated identity sensing means to operate said means for activating said storing means.

10. The invention defined in claim 6 wherein operation of said clearing and conditioning means is delayed a selected interval of time after activation thereof to allow complete activation of one of said ball path indicating means.

11. A ball path indicating system for a plurality of bowling lanes, each lane having a pinspotting machine associated therewith comprising, means associated with each pinspotting machine for sensing the identity of standing pins on the pin deck of each of said lanes, storing means common to each of said pin identity sensing means and operatively coupled thereto for storing the identity of standing pins detected by any of said pin identity sensing means, single ball path computing means operative in response to the activation of said storing means for computing and selecting in accordance with the stored identity of a selected set of standing pins, an optimum ball path for knocking down the maximum number of said selected set of standing pins, an indicating means associated with each of said pinspotting machines, for indicating, when activated, to a bowler a selected ball path, machine selector means connected to each of said pin identity sensing means and each of said indicating means and operative in response to the activation of a first one of said pin identity sensing means during a selected ball cycle of said machines for activating said storing means to store the identity of standing pins identified by said activated sensing means, and further operative to activate one of said indicating means corresponding to said activated pin identity sensing means, said machine selector means including means for preventing an activated pin identity sensing means from one of said other machines from reactivating said storing means until a ball path selection is completed for said machine associated with said first pin identity sensing means.

References Cited by the Examiner
UNITED STATES PATENTS

| | | | |
|---|---|---|---|
| 2,974,955 | 3/1961 | Walsh | 273—43 |
| 2,990,177 | 6/1961 | Hutchison | 273—54 X |

DELBERT B. LOWE, *Primary Examiner.*